US007051944B2

(12) United States Patent
Weisz et al.

(10) Patent No.: US 7,051,944 B2
(45) Date of Patent: May 30, 2006

(54) SCALE AND RELATED PRINTING APPARATUS AND METHOD FOR PRODUCING PROMOTION OFFER LABELS USING LABEL STOCK WITH HEAT ACTIVATED ADHESIVE

(75) Inventors: Robert J. Weisz, Aurora (CA); Nigel G. Mills, Kettering, OH (US); Mark W. Croll, Deerfield, IL (US)

(73) Assignee: Premark FEG L.L.C., Wilmington, DE (US)

( * ) Notice: Subject to any disclaimer, the term of this patent is extended or adjusted under 35 U.S.C. 154(b) by 34 days.

(21) Appl. No.: 10/828,442

(22) Filed: Apr. 20, 2004

(65) Prior Publication Data

US 2005/0230481 A1 Oct. 20, 2005

(51) Int. Cl.
*G06K 19/02* (2006.01)

(52) U.S. Cl. ....................................... 235/488; 235/432

(58) Field of Classification Search ................ 235/383, 235/381, 382, 380, 375, 382.1, 382.5, 456, 235/432, 488

See application file for complete search history.

(56) References Cited

U.S. PATENT DOCUMENTS

| | | | | |
|---|---|---|---|---|
| 3,410,552 | A * | 11/1968 | Collier et al. | 271/65 |
| 3,733,236 | A * | 5/1973 | Young et al. | 156/360 |
| 4,932,485 | A * | 6/1990 | Mori | 177/25.15 |
| 5,578,797 | A | 11/1996 | Hewitt et al. | |
| 5,846,358 | A | 12/1998 | Nagamoto et al. | |
| 6,031,553 | A | 2/2000 | Nagamoto et al. | |
| 6,172,698 | B1 | 1/2001 | Iwata et al. | |
| 6,298,894 | B1 | 10/2001 | Nagamoto et al. | |
| 6,388,692 | B1 | 5/2002 | Iwata et al. | |
| 6,500,536 | B1 | 12/2002 | Yamada et al. | |
| 6,501,495 | B1 | 12/2002 | Ichikawa et al. | |
| 2002/0089323 | A1 | 7/2002 | Jimbo | |
| 2003/0189631 | A1 | 10/2003 | Hoshino et al. | |
| 2003/0197776 | A1 | 10/2003 | Ito et al. | |
| 2003/0226642 | A1 | 12/2003 | Okayasu et al. | |
| 2004/0004656 | A1 | 1/2004 | Sambongi et al. | |
| 2004/0045953 | A1* | 3/2004 | Yoshida et al. | 219/486 |
| 2004/0267621 | A1 | 12/2004 | Schuller et al. | |

FOREIGN PATENT DOCUMENTS

EP 1197892 A2 4/2002

* cited by examiner

*Primary Examiner*—Thien M. Le
(74) *Attorney, Agent, or Firm*—Thompson Hine LLP

(57) ABSTRACT

A scale includes a printing mechanism that operates to produce both adhesive product pricing labels and non-adhesive promotion offer labels using label stock with a heat activated adhesive.

27 Claims, 2 Drawing Sheets

SCALE AND RELATED PRINTING APPARATUS AND METHOD FOR PRODUCING PROMOTION OFFER LABELS USING LABEL STOCK WITH HEAT ACTIVATED ADHESIVE

TECHNICAL FIELD

The present invention relates generally to in-store scales using labels, and more particularly, to a scale and scale system utilizing heat activated adhesive label stock in connection with promotions communicated to customers by information printed on labels.

BACKGROUND

As demonstrated by U.S. Pat. No. 5,578,797, it is known to provide food product scales capable of printing labels having a coupon part with a coupon bar code thereon. As demonstrated by European Patent Application No. EP 1,197, 892 A2, control messages and information can be sent from remote locations to implement or adjust the coupon messages printed by any give scale in a store. The contemplated scales of such references use label stock with an active adhesive on at least portions of one side of the label stock.

SUMMARY

In one aspect, a label printing apparatus is provided for printing labels utilizing a supply of label stock including a first side having an associated activatable adhesive thereon and a second side for printing. The apparatus includes a housing, a label stock supply location, a label exit opening through the housing, a label stock path from the label stock supply location to the label exit opening, a print head positioned along the label stock path for effecting printing operations on label stock moving thereby, an activation mechanism positioned along the label stock path for activating adhesive of label stock moving thereby and a controller connected with the print head for effecting printing operations thereof and connected with the activation mechanism for effecting activation operations thereof. The controller is configured to have at least one mode in which: (i) when the controller operates the print head to print a promotion offer on a given portion of label stock, the controller further operates the activation mechanism to prevent activation of adhesive of the given portion of label stock; and (ii) when the controller operates the print head to print product pricing information on a particular portion of label stock, the controller further operates the activation mechanism to activate adhesive on the particular portion of label stock.

In another aspect, a label printing apparatus for printing product labels and promotion labels on a supply of label stock including a first side having an associated heat activated adhesive thereon and a second side for printing is provided. The apparatus includes a print head positioned along a label stock path for effecting printing operations on a second side of label stock as label stock moves thereby, and a heating mechanism positioned along the label stock path for heating heat activated adhesive during movement of label stock. A controller is connected with the print head for effecting printing operations thereof and connected with the heating mechanism for effecting heating operations thereof. The controller operates for production of labels including a food product pricing portion and a promotion portion. When operating to produce a food product pricing portion the controller controls the print head to print price information on the food product pricing portion and controls the heating mechanism to activate heat activated adhesive associated with the food product pricing portion. When operating to produce a promotion portion the controller controls the print head to print promotion information on the promotion portion and controls the heating mechanism to prevent activation of heat activated adhesive of the promotion portion.

In a further aspect, a method is provided for dynamically printing a promotion offer label using a label printing apparatus having a supply of label stock including a first side having an associated heat activated adhesive thereon and a second side for printing, a print head arranged for selectively printing on the second side, and a heating mechanism arranged for selectively heating the first side. The method involves the steps of: (a) based upon a product code identified to the label printing mechanism, identifying both: (i) information to be used in the production of a product pricing label, and (ii) characteristics of a promotion offer label to be produced, at least one of the characteristics being a size for the promotion offer label; (b) producing the product pricing label, including printing on the product pricing label and activating heat activated adhesive on the product pricing label; and (c) producing the promotion offer label in accordance with the size characteristic, including printing on the promotion offer label and refraining from activating the heat activated adhesive on the promotion offer label.

DESCRIPTION

Figure 1:
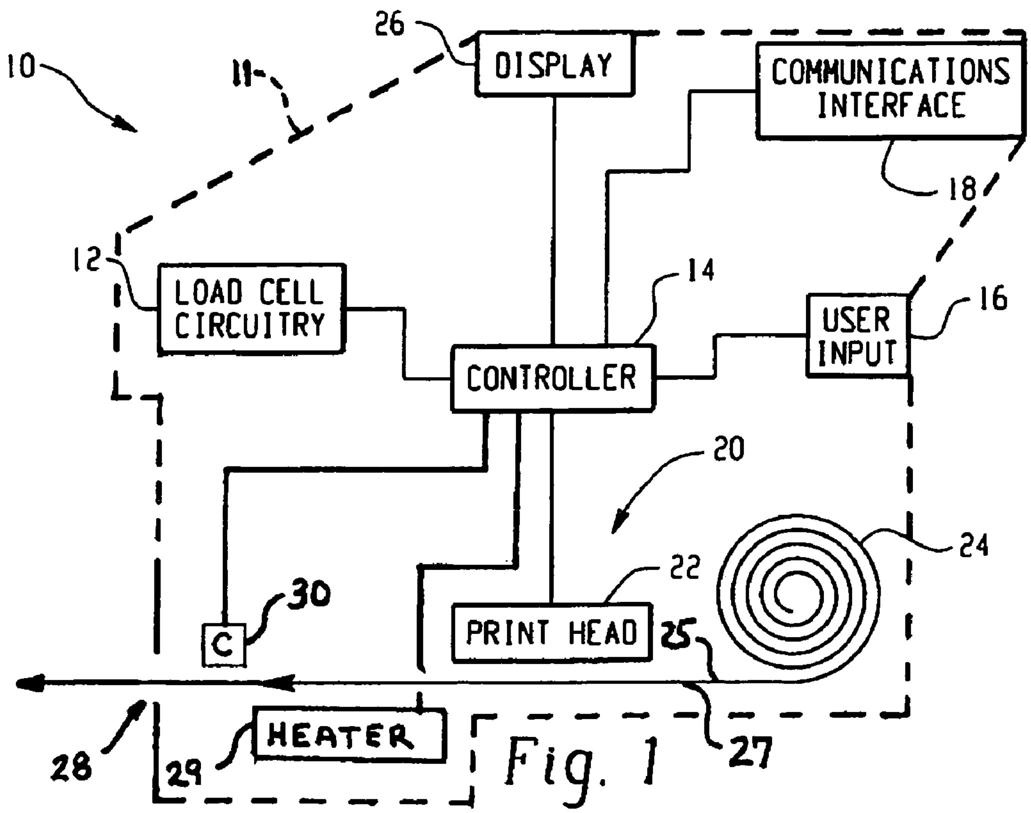
FIG. 1 is a schematic depiction of a food product scale for producing promotion offer labels and product pricing labels using a supply of label stock with a heat activated adhesive.
Figure 2:
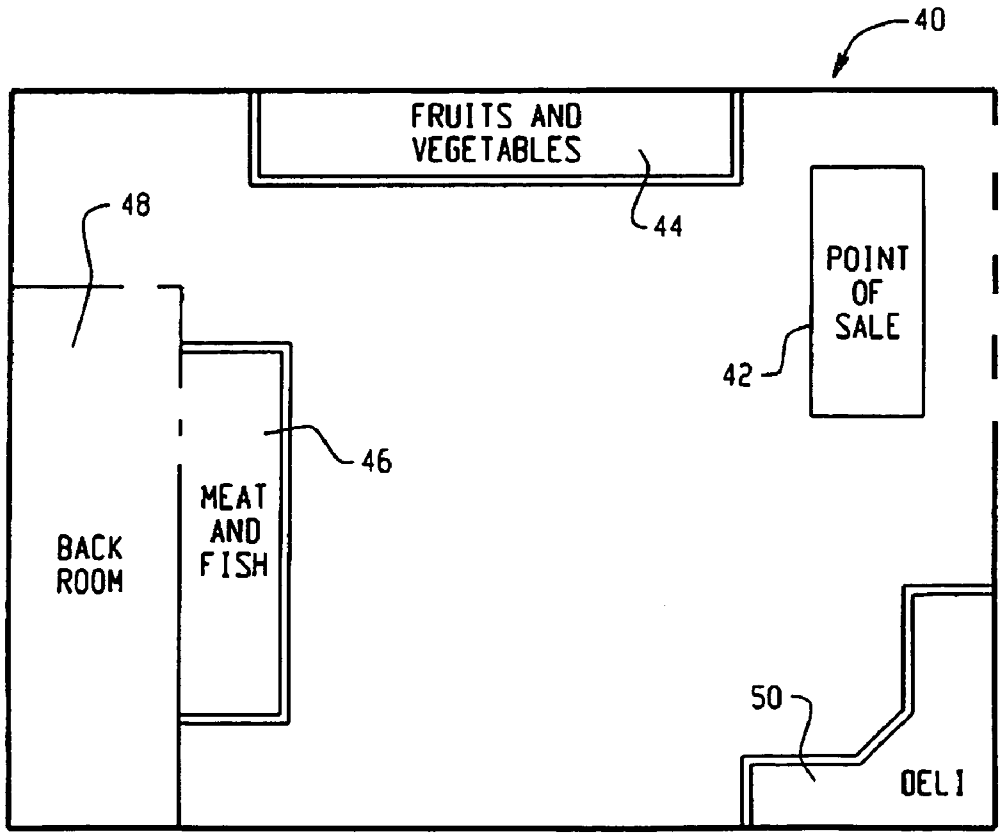
FIG. 2 is a plan view of an exemplary store.

Referring to FIGS. 1 and 2, a brief introduction providing a context for the scale label printing apparatus and related system hereafter described is provided. As used herein, the term "promotion" is intended to broadly encompass coupons, other incentives, and even advertisements and marketing messages to be distributed to consumers. Each such distribution of a promotion is referred to herein as a "promotion offer." FIG. 1 schematically shows an exemplary food product scale 10 with a housing represented by dashed line 11. The scale 10 includes an associated weighing station 12 having a load cell or other known weighing mechanism or device to produce weight indicative signals that are passed to a controller 14. A user input device 16 (such as a keypad, a touch sensitive display, a scanner, etc) is also connected to the controller 14. The user input device 16 may be utilized by store personnel (or in the case of a self service situation the customer) to identify the product being weighed, usually by a PLU (price look-up) number. The controller 14 refers to a price database (stored in suitable memory of the controller or accessible via a link through communications interface 18 to another computer system) to identify the price per unit weight linked to the entered PLU or other product identifier, and calculates a total price for the product based upon the weight as indicated by the weight indicative signals received from the weighing station 12. The controller 14 then establishes product print data (such as total price, price per unit weight, product bar code, logos or other image data, label set-up and format) to be delivered to a printing mechanism 20. The printing mechanism 20 includes a print head 22 and associated supply of label stock 24 to be applied to products once the product print data is printed on a label and the label is output. The print head 22 is positioned along a label stock path that extends from the location of the label stock supply 24 to a label exit opening 28 of the scale housing 11. In an alternative arrangement the label stock supply 24 may be located exterior of housing 11 and the label stock path may extend through the housing 11, with the print head 22 within the housing.

In the contemplated system the label stock 24 includes one side 25 for printing of indicia and an opposite side 27 having a layer of heat activated adhesive thereon. The print head 22 may be a thermal print head, with the labels including a heat activated indicia layer for generating indicia responsive to activation of thermal elements on the print head 22. The heat activated indicia layer may be covered by a clear coat layer. It is recognized that other print head types could be used, including those that physically apply an ink or other material to label stock in order to mark indicia The heat activated adhesive side 27 of the labels may be entirely or partially coated with the heat activated adhesive, and the labels may be formed of any suitable material, such as paper, plastic, other polymers, resins or combinations of the same. A heating mechanism 29, which in one example may be similar to a thermal print head with a plurality of heating elements arranged to extend in a direction across the label stock path, is located at the downstream side of the print head 22, with the controller 14 connected to the heating mechanism 29 to control the generation of heat by the heating mechanism 29, which in turn activates the heat activated adhesive before the label stock exits opening 28 in the scale housing 11. The scale also includes a display 26 for displaying information, such as weight and price of the item being weighed. One or more cutter mechanisms 30 may be provided for cutting the label stock. For example a cutting mechanism that extends across a width of the label stock and moves against the label stock might be used. Additionally, a cutting mechanism, such as a rolling cutter or knife blade could be used to make cuts along the length of the label stock. Both types of cutting mechanisms could be incorporated. The controller 14 could be connected to control any of these cutting mechanisms.

FIG. 1 provides merely one schematic example of a scale including an exemplary printer mechanism for handling label stock with a heat activated adhesive layer. Examples of label stock including a heat activated adhesive and devices for printing and handling such label stock and activating the adhesive of such label stock are described in U.S. Pat. Nos. 6,501,495; 6,500,536; 6,388,692; 6,298,894; 6,172,698; 6,031,553; and 5,846,358, and in U.S. Published Application Nos. 2004/0004656 A1; 2003/0226642 A1; 2003/0197776 A1; and 2003/0189631 A1.

The various components of the scale 10 could be integrated into a single housing or unit as reflected by housing 11. Alternatively, the scale 10 may be formed of components formed as separate units and connected together for communication with each other, in which case the controller may be a distributed controller, with various control functions distributed among the components. As used herein the terminology "controller" is intended to encompass the distributed controller configuration. Further, the term "controller" is intended to broadly encompass the collection of circuits, processors and other components that carry out the various operating and processing functions of the scale and its component parts.

Referring now to FIG. 2, the scale 10 may be located within a store 40 having a point of sale 42 with an associated computerized checkout system, typically including a plurality of check out lanes, each with a corresponding bar code scanner, cash register and electronic payment terminal (as used for paying by credit card or debit card). The scale 10 is preferably located at another location, such as a perishables department as represented by the fruit and vegetable department 44, the meat and fish department 46 or associated back room 48, or the deli department 50 so that promotion offers can be provided to customers prior to the actual purchase of any products and prior to the customer being on the way out of the store.

Multiple scales 10 within a store 40 can be used to distribute promotion offers to customers for promoted products in relation to linking products. The term "linking product" is use herein to refer to a product that, when weighed by the scale, causes a promotion offer to be generated for a promoted product that is different that the linking product. Often times there will be some identifiable relationship between the linking product and the promoted product, such as two food products that are complimentary to each other. However, there is no requirement that the linking product and the promoted product have any identifiable relationship other than the promotion itself. In some promotion systems promotion offers may be generated by in-store devices other than scales. Accordingly, the term "linking product" encompasses products that when identified to such non-scale devices (as by scanning a product code or manual input of a product code) cause such non-scale devices to print, or otherwise communicate (e.g., as by a display) to a consumer, a promotion offer for a promoted product that is different than the linking product.

The use of label stock including heat activated adhesive in connection with the printing of promotion offers is now described. In one example, a scale is located in the deli department of a store and a customer requests a certain quantity of a specific product. The scale operator slices or otherwise obtains the specific product and places it on the scale for weighing, entering a PLU number or other product code for the specific product via the user interface 16. The scale 10 uses the PLU number to access a pricing database (internal or remote) for use in establishing the price of the weighed item. The scale 10 also uses the PLU number to access a promotion database (again internal or remote) to identify any promotions associated with or linked to the weighed item (i.e., determine whether the weighed item is a linking product). Where one or more promotions are associated with the weighed item, the controller may cause promotion information for the one or more promotions to be printed on label stock as a promotion offer.

In practice, in many circumstances it will be desirable for the promotion offer to be distributed as a non-tacky document. As used herein the term "document" is used broadly to encompass any material on which the promotion offer is visually perceptible. For example, where the promotion offer takes the form of a coupon with associated coupon bar code, the promotion offer should be on a non-tacky material for ease of handling by both the customer, store and downstream coupon processing parties. As another example, even if the promotion offer is not a coupon per se, it may be beneficial to actually hand the promotion offer document directly to a customer, rather than applying it to a package, to be sure that the customer takes note of the promotion offer. Where the customer can physically handle the promotion offer document they will be more likely to respond to the promotion offer.

When the controller 14 identifies a promotion associated with the weighed item, the controller 14 operates the print head 22 to print a promotion on side 25 of a given portion of the label stock 24, and the controller 14 further operates the heating mechanism 29 to prevent activation of heat activated adhesive on side 27 of the given portion of the label stock, as by refraining from effecting energization of the heating elements of the heating mechanism 29. The controller 14 also operates the print head 22 to print product pricing information for the weighed item on side 25 of a particular portion of the label stock, and the controller 14 further operates the heating mechanism 29 to activate heat activated adhesive on side 27 of the particular portion of the label stock. In other words, when an item is weighed and priced, and that item is a linking product with an associated promotion, the controller 14 effects output of a promotion offer label in which the adhesive has not been activated, and also effects output of a product pricing label in which the adhesive has been activated, enabling the product pricing label to be attached to the package containing the weighed item. The physical relationship between the promotion offer label and the product pricing label can take various forms.

Figure 3:
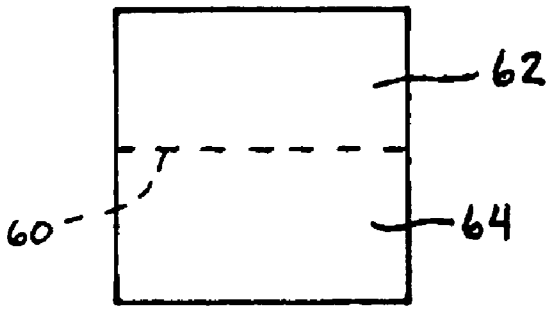
FIG. 3 is one exemplary configuration of a promotion offer label combined with a product pricing label.

In one embodiment, the given portion of label stock and the particular portion of label stock are located back to back (i.e., one following the other) along the supply of label stock. In such case one of the product pricing label and the promotion offer label is output by the scale followed by the other of the product pricing label and the promotion offer label. In one implementation of this embodiment (see FIG. 3) the product pricing label 62 and the promotion offer label 64 remain attached to each other as they are output from the scale, with a separation line 60 (which may be a series of perforations, a score line or any other line of weakness in the label material) formed between the two to enable the scale operator or the customer to separate the promotion offer label from the product pricing label, either before or after the product pricing label is adhesively attached to a package. The separation line 60 may be premanufactured into the label stock 24, or the separation line 60 may be created on the fly by the controller 14 effecting operation of a cutting mechanism 30 that acts on the label stock. In another implementation of this embodiment the product pricing label and the promotion offer label are separated before they are output by the scale, as by the controller 14 effecting operation of cutting mechanism 30 to act on the label stock and completely sever the product pricing label from the promotion offer label. The operator can then apply the product pricing label to the package and can hand the promotion offer label to the customer. As another alternative a tear bar could be located near the output opening 28, allowing an operator to separate the pricing label from the promotion offer label if desired, without the need for an active cutting mechanism or premanufactured separation lines.

Figure 4:
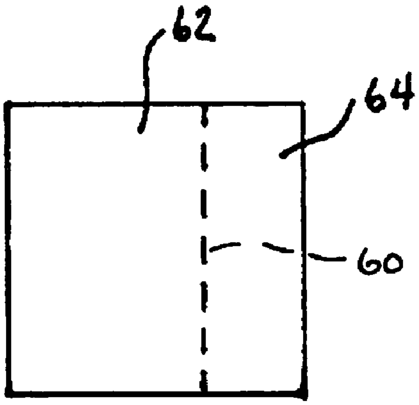
FIG. 4 is another exemplary configuration of a promotion offer label combined with a product pricing label.

In another embodiment, the given portion of label stock and the particular portion of label stock are side-by-side along a width of the label stock. In such case the product pricing label and the promotion offer label are output by the scale simultaneously. In one implementation of this embodiment (see FIG. 4) the product pricing label 62 and the promotion offer label 64 remain attached to each other as they are output from the scale, with a separation line 60 formed between the two to enable the scale operator or the customer to separate the promotion offer label from the product pricing label, either before or after the product pricing label is adhesively attached to a package. The separation line 60 may be premanufactured into the label stock 24, or the separation line may be created on the fly by the controller 14 effecting operation of cutting mechanism 30 (such as a rolling knife) that acts on the label stock. In another implementation of this embodiment the product pricing label 62 and the promotion offer label 64 are separated before they are output by the scale, as by the controller 14 effecting operation of the cutting mechanism 30 to act on the label stock and completely sever the product pricing label from the promotion offer label. The operator can then apply the product pricing label to the package and can hand the promotion offer label to the customer.

Figure 5:
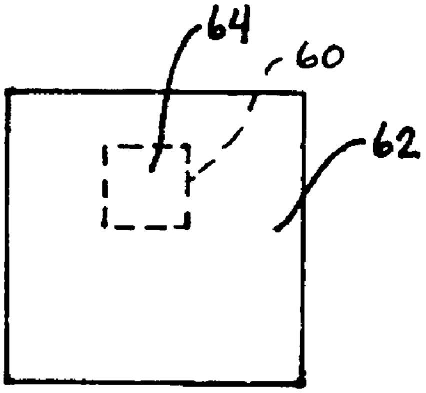
FIG. 5 is another exemplary configuration of a promotion offer label combined with a product pricing label.

In yet another embodiment, the given portion of label stock and the particular portion of label stock may be more integrated with each other. For example, the given portion of label stock may be bordered on two or more sides, including possibly completed surrounded (as per FIG. 5), by the particular portion of label stock, again with a separation line or lines 60 provided between the promotion offer label 64 and the product pricing label 62. Again, the separation line or lines may be premanufactured in the label stock or created on the fly.

Utilizing the above technique to produce both adhesive product pricing labels and non-adhesive promotion offer labels provides a number of advantages over systems using traditional adhesive label stock. For example, systems using traditional adhesive label stock, such as that referenced in U.S. Pat. No. 5,578,797 and European Patent Application No. EP 1,197,892 A2, can be fairly limited in the size, configuration and orientation of the promotion offer label produced because the adhesive for the promotion offer label must be deadened during manufacture of the label stock and/or because the separation line for enabling removal of the promotion offer label must be pre-specified during manufacture of the label stock. In other words, every promotion offer output by such systems is typically identical in size and shape as well as relationship to the product pricing label, with differences being effected only by what promotion information is printed.

In contrast, the scale and system contemplated herein, which utilizes label stock with heat activated adhesive and which includes one or more cutting mechanisms for producing separation lines or for completely severing, or which includes a tear bar, enables more dynamic promotion offer label production. For example, the size of the promotion offer label can vary between promotion offer labels produced from the same roll of label stock. It is contemplated that promotion space will be made available to product manufacturers in a manner that will enable them to configure their own promotion, including selecting (i) the linking products(s) that will cause the promotion offer label to be printed, (ii) the desired size of the promotion offer label and/or (iii) the desired physical relationship (e.g., side-by-side or back to back) the promotion offer label will have relative to its related product pricing label. A manufacturer selecting one size for a promotion offer label might be charged one price per promotion offer label distributed, while a manufacturer selecting a larger size promotion offer label might be charged a higher price for selecting the larger size. Pricing might also be varied according to the physical relationship the promotion offer label will have relative to its related product pricing label. Different linking products might also have different numbers of promotion offers. For example, salami could cause a single promotion offer to be printed on a promotion offer label, while ham could cause multiple promotion offers to be printed on either a single promotion offer label or multiple promotion offer labels.

It is recognized that numerous other variations exist, including both narrowing and broadening variations of the above-described embodiments and examples. While described primarily in connection with a scale, it is recognized that the printing mechanism for printing both product pricing labels and promotion offer labels may be separate from any scale device. Moreover, while the primary embodiment contemplates the use of a heat activated adhesive, it is recognized that other activatable adhesives might be used, such as adhesives activated by particular wavelengths of light, in which case the heating mechanism might be replaced with an appropriate light source. Other variations are also possible.

What is claimed is:

1. A label printing apparatus for printing labels utilizing a supply of label stock including a first side having an associated activatable adhesive thereon and a second side for printing, comprising:

a housing;

a label stock supply location;

a label exit opening through the housing;

a label stock path from the label stock supply location to the label exit opening;

a print head positioned along the label stock path for effecting printing operations on label stock moving thereby;

an activation mechanism positioned along the label stock path for activating adhesive of label stock moving thereby;

a controller connected with the print head for effecting printing operations thereof and connected with the activation mechanism for effecting activation operations thereof;

wherein the controller is configured to have at least one mode in which:

when the controller operates the print head to print a promotion offer for a promoted product on a given portion of label stock, the controller further operates the activation mechanism to prevent activation of adhesive of the given portion of label stock, the promotion offer is selected based upon a product identifying code for a given product that is different than the promoted product;

when the controller operates the print head to print product pricing information for the given product on a particular portion of label stock, the controller further operates the activation mechanism to activate adhesive on the particular portion of label stock, the given portion of label stock is adjacent the particular portion of label stock.

2. The apparatus of claim 1 wherein the activatable adhesive is a heat activated adhesive and the activation mechanism is a heating mechanism.

3. The label printing apparatus of claim 1 wherein the controller is operable such that the given portion of label stock and the particular portion of label stock are side-by-side.

4. The label printing apparatus of claim 1 further including a cutter positioned along the label stock path, the controller operable to cause the cutter to produce a separation line between the given portion and the particular portion.

5. The label printing apparatus of claim 1 wherein the given portion of label stock and the promotion portion of label stock are located one following the other.

6. The label printing apparatus of claim 5, further comprising a cutter positioned along the label stock path and operable to produce a separation line between the given portion and the particular portion.

7. A scale including the label printing apparatus of claim 1, comprising:

a weighing station for weighing products and producing weight indicative signals, the label printing apparatus of claim 1 integrated with the scale;

wherein the controller is connected to receive weight indicative signals from the weighing station.

8. A label printing apparatus for printing labels, comprising:

a housing;

a supply of label stock including a first side having an associated heat activated adhesive thereon and a second side for printing;

a label exit opening through the housing;

a label stock path from the supply of label stock to the label exit opening;

a print head positioned along the label stock path for effecting printing operations on the second side of label stock as label stock moves thereby;

a heating mechanism positioned along the label stock path for heating heat activated adhesive during movement of label stock thereby;

a controller connected with the print head for effecting printing operations thereof and connected with the heating mechanism for effecting heating operations thereof;

when the controller operates the print head to print a promotion for a promoted product on the second side of a given portion of the label stock, the controller further operates the heating mechanism to prevent activation of heat activated adhesive on the first side of the given portion of the label stock, the promotion is selected based upon a product identifying code for a given product that is different than the promoted product;

when the controller operates the print head to print product pricing information for the given product on the second side of a particular portion of the label stock, the controller further operates the heating mechanism to activate heat activated adhesive on the first side of the particular portion of the label stock, the given portion of label stock is adjacent the particular portion of label stock.

9. The label printing apparatus of claim 8 wherein the controller is operable such that the given portion of label stock extends only partially across a width of the label stock.

10. The label printing apparatus of claim 9 wherein the controller is operable such that the particular portion of label stock extends only partially across the width of the label stock.

11. The label printing apparatus of claim 10 wherein the controller is operable such that the given portion of label stock and the particular portion of label stock are side-by-side.

12. The label printing apparatus of claim 11 wherein the label stock includes a preformed separation line extending along its length to enable separation of the given portion and the particular portion.

13. The label printing apparatus of claim 11 further including a cutter positioned along the label stock path, the controller operable to cause the cutter to produce a separation line between the given portion and the particular portion.

14. The label printing apparatus of claim 8 wherein the controller is operable such that the given portion of label stock extends entirely across a width of the label stock.

15. The label printing apparatus of claim 14 wherein the controller is operable such that the particular portion of label stock extends entirely across the width of the label stock.

16. The label printing apparatus of claim 15 wherein the label stock includes preformed laterally extending separation lines.

17. The label printing apparatus of claim 15, further comprising a cutter positioned along the label stock path and operable to engage the label stock and produce a separation line between the given portion and the particular portion.

18. A scale including the label printing apparatus of claim 8, comprising:

a weighing station for weighing products and producing weight indicative signals, the label printing apparatus of claim 8 integrated with the scale;

wherein the controller is connected to receive weight indicative signals from the weighing station.

19. A label printing apparatus for printing product labels and promotion labels on a supply of label stock including a first side having an associated heat activated adhesive thereon and a second side for printing, the scale comprising:

a print head positioned along a label stock path for effecting printing operations on a second side of label stock as label stock moves thereby;

a heating mechanism positioned along the label stock path for heating heat activated adhesive during movement of label stock;

a controller connected with the print head for effecting printing operations thereof and connected with the heating mechanism for effecting heating operations thereof, wherein the controller operates for production of both a product pricing label and a promotion offer label during a transaction associated with a given product, when operating to produce the product pricing label the control unit controls the print head to print price information for the given product and controls the heating mechanism to activate heat activated adhesive, and when operating to produce a the promotion offer label the control unit controls the print head to print promotion information for a promoted product and controls the heating mechanism to prevent activation of heat activated adhesive, the promotion offer is selected by the controller based at least in part upon identity of the given product, the promoted product is different than the given product, and the product pricing label and the promotion offer label are output one after the other.

20. The label printing apparatus of claim 19 wherein the heating mechanism is located between the print head and a label exit opening of the label printing apparatus.

21. A scale including, the label printing apparatus of claim 19, comprising:

a weighing station for weighing products and producing weight indicative signals, the label printing apparatus of claim 19 integrated with the scale;

wherein the controller is connected to receive weight indicative signals from the weighing station.

22. A label printing apparatus for printing product labels and promotion offer labels on a supply of label stock including a first side having an activatable adhesive thereon and a second side for printing, the scale comprising:

a print head positioned along a label stock path for effecting printing operations on a second side of label stock as label stock moves thereby;

an activation mechanism positioned along the label stock path for selectively activating adhesive during movement of label stock;

a controller connected with print head for effecting printing operations thereof and connected with the activation mechanism for effecting heating operations thereof, wherein the control unit operates for production of labels including a food product pricing portion and a promotion offer portion, when operating to produce a given label with a corresponding food product pricing portion and a corresponding promotion offer portion the control unit controls the print head to print price information for a given product on the corresponding food product pricing portion and controls the activation mechanism to activate adhesive associated with the corresponding food product pricing portion, and the control unit controls the print head to print promotion information for a promoted product on the corresponding promotion offer portion and controls the activation mechanism to prevent activation of adhesive of the corresponding promotion offer portion, where the promoted product is different than the given product and the promotion information is established based at least in part upon identity of the given product.

23. A scale including the label printing apparatus of claim 22, comprising:

a weighing station for weighing products and producing weight indicative signals, the label printing apparatus of claim 22 integrated within a housing of the scale;

wherein the controller is connected to receive weight indicative signals from the weighing station.

24. The scale of claim 23 wherein the activatable adhesive is activated by heat, and the activation mechanism comprises a heating mechanism.

25. A method for dynamically printing a promotion offer label using a label printing apparatus having a supply of label stock including a first side having an associated heat activated adhesive thereon and a second side for printing, a print head arranged for selectively printing on the second side, and a heating mechanism arranged for selectively heating the first side, the method comprising:

based upon a product code identified to the label printing mechanism, identifying both:

(i) information to be used in the production of a product pricing label, and (ii) characteristics of a promotion offer label to be produced, at least one of the characteristics being a size for the promotion offer label;

producing the product pricing label including printing on the product pricing label and activating heat activated adhesive on the product pricing label; and producing the promotion offer label in accordance with the size characteristic, including printing on the promotion offer label and refraining from activating the heat activated adhesive on the promotion offer label.

26. The method of claim 25 wherein the promotion offer label is attached with the product pricing label.

27. The method of claim 25 wherein the label printing apparatus includes at least on cutting mechanism for engaging the label stock to produce a separation line therein the step of producing the promotion offer label includes applying the cutting mechanism to the label stock to establish a promotion offer label size corresponding to the identified size characteristic.

* * * * *

UNITED STATES PATENT AND TRADEMARK OFFICE

CERTIFICATE OF CORRECTION

PATENT NO. : 7,051,944 B2
APPLICATION NO. : 10/828442
DATED : May 30, 2006
INVENTOR(S) : Robert J. Weisz et al.

It is certified that error appears in the above-identified patent and that said Letters Patent is hereby corrected as shown below:

Col. 9

Line 33 – After the word "produce" delete "a".

Line 46 – After the word "including" delete ",".

Signed and Sealed this

Fifteenth Day of August, 2006

JON W. DUDAS
*Director of the United States Patent and Trademark Office*